(12) United States Patent
Robinson et al.

(10) Patent No.: US 9,908,186 B2
(45) Date of Patent: Mar. 6, 2018

(54) ELECTRICAL CONNECTOR CONFIGURING DIES, TOOL AND METHOD

(75) Inventors: Thomas E. Robinson, Indian Harbour Beach, FL (US); Alan D. Beck, Bow, NH (US); Mark A. Chiasson, Merrimack, NH (US); Clayton W. Mack, Webster, NH (US); Thomas R. Faucher, Manchester, NH (US)

(73) Assignee: Hubbell Incorporated, Shelton, CT (US)

( * ) Notice: Subject to any disclaimer, the term of this patent is extended or adjusted under 35 U.S.C. 154(b) by 670 days.

(21) Appl. No.: 12/661,501

(22) Filed: Mar. 18, 2010

(65) Prior Publication Data

US 2010/0236315 A1    Sep. 23, 2010

Related U.S. Application Data

(60) Provisional application No. 61/161,176, filed on Mar. 18, 2009.

(51) Int. Cl.
*B23D 29/00* (2006.01)
*B23D 15/04* (2006.01)

(52) U.S. Cl.
CPC ............. *B23D 29/00* (2013.01); *B23D 15/04* (2013.01)

(58) Field of Classification Search
CPC .. H01R 43/04; H01R 43/042; H01R 43/0427; H01R 43/0428; H01R 43/045; B21D 28/14; B21D 28/145; B21D 45/003; B25B 27/146
USPC ...... 72/416, 409.01, 409.1, 409.13, 21, 421, 72/413, 465.1, 466.9, 409.12, 402, 72/409.19, 235, 332, 337, 338, 410; 30/81, 92, 112, 134, 184, 213, 228, 192, 30/194, 229, 254, 180, 182; 49/620; 439/620, 883; 29/282, 283.5, 750, 751, 29/203; 83/13, 273, 276, 280, 456, 466
See application file for complete search history.

(56) References Cited

U.S. PATENT DOCUMENTS

| | | | | |
|---|---|---|---|---|
| 2,308,953 | A * | 1/1943 | Brown | 72/327 |
| 2,761,378 | A * | 9/1956 | Lancaster | 100/269.12 |
| 2,831,684 | A * | 4/1958 | Cundall | 271/85 |
| 3,228,222 | A * | 1/1966 | Maier | 72/56 |
| 3,710,610 | A * | 1/1973 | McCaughey | 72/409.06 |
| 4,309,928 | A * | 1/1982 | Mitrzyk et al. | 83/161 |
| 4,738,018 | A * | 4/1988 | Ebrahimian | 29/560 |
| 5,195,413 | A * | 3/1993 | Johnson | 83/132 |

(Continued)

FOREIGN PATENT DOCUMENTS

CN           1597208        *  9/2004    ............ B23D 33/02

*Primary Examiner* — Dmitry Suhol
*Assistant Examiner* — Peter Iannuzzi
(74) *Attorney, Agent, or Firm* — Harrington & Smith (57) ABSTRACT

A die set adapted to remove an end of a substantially flat lug of an electrical connector. The die set includes a first die and a second die. The first die includes a first frame and a spring loaded member connected to the first frame. The first frame includes a first contact surface adapted to directly contact a first side of the lug. The second die includes a second frame having a second contact surface adapted to contact a second side of the lug at a position offset from the first contact surface. The spring loaded member is adapted to contact the first side of the lug directly opposite the second contact surface. The first and second contact surfaces are adapted to shear off the end of the lug from the electrical connector.

8 Claims, 11 Drawing Sheets

(56) References Cited

U.S. PATENT DOCUMENTS

| | | | |
|---|---|---|---|
| 5,457,889 A | 10/1995 | Kimura | 30/228 |
| 5,730,022 A * | 3/1998 | Hansson et al. | 72/453.16 |
| 5,779,958 A * | 7/1998 | Nishihara et al. | 264/161 |
| 6,230,542 B1 | 5/2001 | Frenken | 72/456 |
| 6,532,790 B2 | 3/2003 | Frenken | 72/456 |
| 6,792,789 B1 | 9/2004 | Faucher | 72/456 |
| 7,020,967 B2 | 4/2006 | Kimura | 30/95 |
| 7,124,619 B1 * | 10/2006 | Lefavour et al. | 72/456 |
| 7,134,314 B1 * | 11/2006 | Peterson et al. | 72/455 |
| 7,428,859 B2 * | 9/2008 | Fujita et al. | 83/456 |
| 7,555,975 B2 * | 7/2009 | Cote et al. | 83/13 |
| 7,717,022 B2 * | 5/2010 | Spiga et al. | 83/568 |
| 8,015,851 B2 * | 9/2011 | Sasaki et al. | 72/347 |

\* cited by examiner

ELECTRICAL CONNECTOR CONFIGURING DIES, TOOL AND METHOD

CROSS REFERENCE TO RELATED APPLICATION

This application claims priority under 35 U.S.C. 119(e) on U.S. Provisional Patent Application No. 61/161,176 filed Mar. 18, 2009 which is hereby incorporated by reference in its entirety.

BACKGROUND OF THE INVENTION

Field of the Invention

The invention relates to configuring an electrical connector and, more particularly, to a die set, tool and method for modifying an electrical connector.

BRIEF DESCRIPTION OF PRIOR DEVELOPMENTS

U.S. Pat. No. 6,792,789 B1 describes a hydraulic tool having removable cutting dies and crimping dies. Co-pending U.S. patent application Ser. No. 12/287,352 filed Oct. 7, 2008 and U.S. Patent Publication No. 2008/0182462 A1, which are hereby incorporated by reference in their entireties, describe electrical connectors with reproducibly modifiable lugs.

Although the electrical connectors described in U.S. patent application Ser. No. 12/287,352 and U.S. Patent Publication No. 2008/0182462 A1 are versatile for different situations, for an electrical connector having a very thick lug, or for a large volume of lugs needing to be modified, it would be difficult for a user to quickly break off or cut off the end of the lug with a manually operated hand tool; and could perhaps also be manually exhausting. Thus, there is a desire to provide a machine tool which can cut or break off the end of a lug of an electrical connector.

SUMMARY

The following summary is merely intended to be exemplary. The summary is not intended to limit the scope of the claimed invention.

In accordance with one aspect of the invention, a die set adapted to remove an end of a substantially flat lug of an electrical connector is provided. The die set includes a first die and a second die. The first die includes a first frame and a spring loaded member connected to the first frame. The first frame includes a first contact surface adapted to directly contact a first side of the lug. The second die includes a second frame having a second contact surface adapted to contact a second side of the lug at a position offset from the first contact surface. The spring loaded member is adapted to contact the first side of the lug directly opposite the second contact surface. The first and second contact surfaces are adapted to shear off the end of the lug from the electrical connector.

In accordance with another aspect of the invention, a tool is provided comprising a working head adapted to remove an end of a substantially flat lug of an electrical connector, wherein the lug comprises a laterally extending breakaway recess on an exterior side, wherein the working head comprises dies configured to contact opposite sides of the lug and break the lug proximate the breakaway recess.

In accordance with another aspect of the invention, a method is provided comprising placing a substantially flat lug of an electrical connector between two dies; and moving the two dies towards each other, wherein a first contact surface of a first one of the dies is offset from a second contact surface of a second one of the dies to shear off an end of the lug from the electrical connector, and wherein the first die comprises a first spring loaded member contacting the lug directly opposite the second contact surface.

BRIEF DESCRIPTION OF THE DRAWINGS

The foregoing aspects and other features of the invention are explained in the following description, taken in connection with the accompanying drawings, wherein.

DETAILED DESCRIPTION OF EMBODIMENTS

Figure 1:
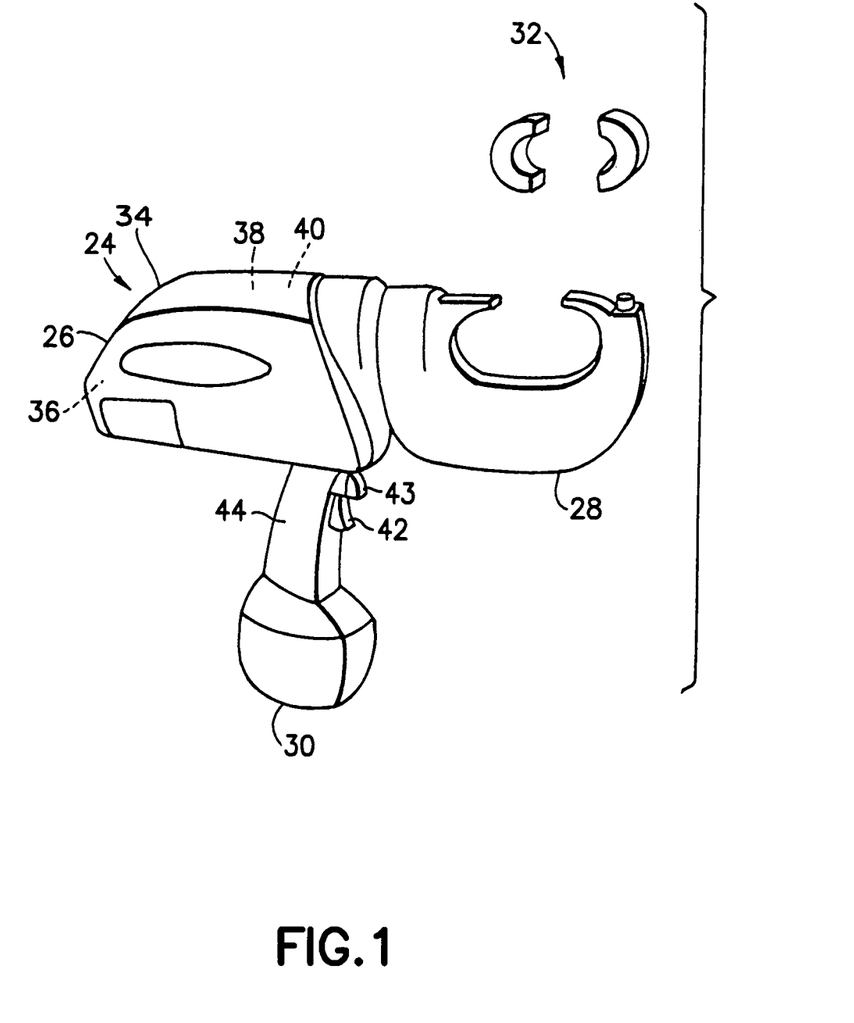
FIG. 1 is a perspective view of a hand-held, battery operated, hydraulic compression tool incorporating features of the invention.

Referring to FIG. 1, there is shown a perspective view of a tool 24. Although the invention will be described with reference to the exemplary embodiments shown in the drawings, it should be understood that the invention can be embodied in many alternate forms of embodiments. In addition, any suitable size, shape or type of elements or materials could be used.

Figure 7:
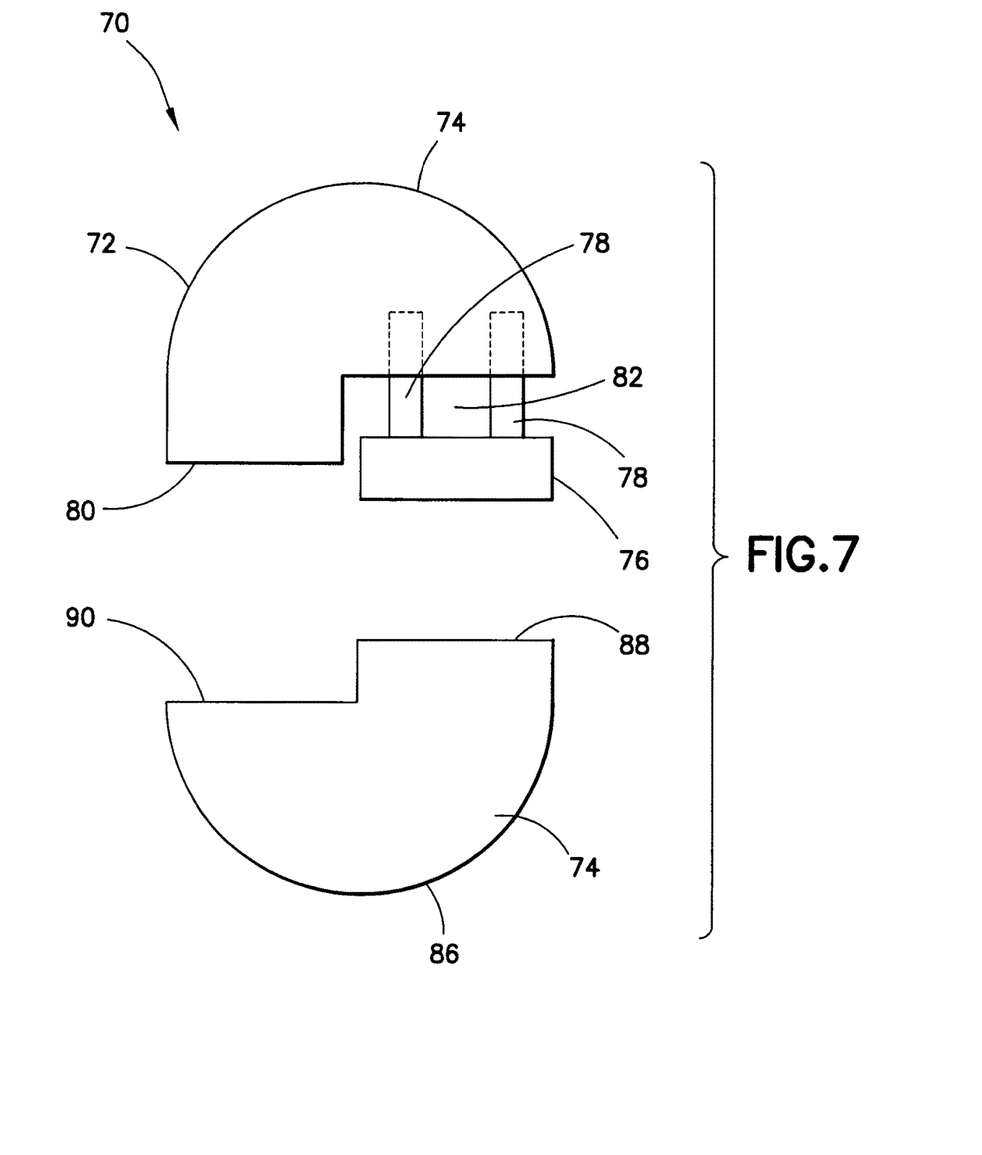
FIG. 7 illustrates a pair of dies, for use with the tool shown in FIG. 1, comprises features of the invention.

The tool 24 is a hand-held battery operated hydraulic crimping tool. However, in alternate embodiments, features of the invention could be used in any suitable type of hydraulic tool or fluid tool such as a pneumatic tool for example, or any tool having a movable ram. The tool 24 generally comprises a main section 26, a working head 28, and a battery 30. In this embodiment the working head 28 is adapted to receive removable dies 32. The dies 32 are crimp dies, but as seen in FIG. 7, the dies could be cutting dies. In alternate embodiments the working head might have non-removable cutting sections rather than removable cutting dies.

The main section 26 generally comprises an exterior housing 34, an electric motor 36, a hydraulic pump 38, a fluid conduit system 40 including a fluid reservoir for conduiting fluid to and from the working head 28, and a control system including user actuated triggers 42, 43. In an alternate embodiment, the main section 26 could be adapted to be connected to a remote hydraulic fluid supply by hydraulic hoses. The housing comprises a handle 44. The triggers 42, 43 are mounted on the handle. The battery 30 is removably mounted to the bottom of the handle 44. The battery comprises a rechargeable battery. In an alternate embodiment the battery might not be removable or might not be rechargeable.

Figure 2:
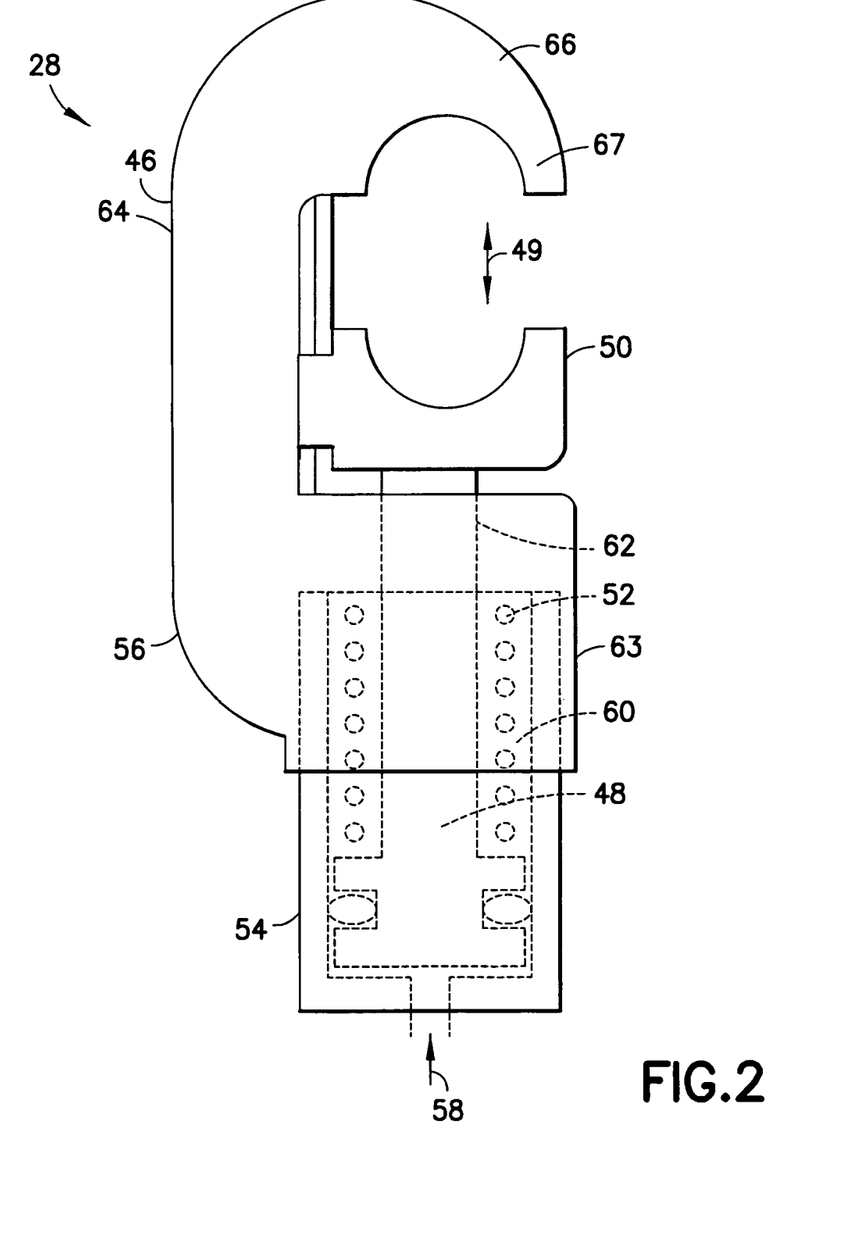
FIG. 2 is a side view of the working head of the tool shown in FIG. 1.

Referring also to FIG. 2, the working head 28 generally comprises a frame 46, a ram 48, a die holder section 50 at a top end of the ram 48, and a spring 52. The frame 46 comprises a first frame member 54 fixedly connected to a frame of the fluid conduit system 40 and a second frame member 56. The first frame member 54 comprises an inlet/outlet aperture 58 and a ram receiving area 60. The second frame member 56 is fixedly connected to the first frame member to substantially enclose the ram receiving area 60 except at the aperture 58 and a ram hole 62 through the second frame member 56. The spring 52 is located in the ram receiving area 60. The ram 48 is movably connected to the frame in a first longitudinal direction 49, wherein the ram is adapted to be moved relative to the frame by hydraulic fluid. The spring 52 biases the ram 48 in a retracted position as shown. However, the bias of the spring can be overcome by hydraulic fluid entering the area 60 from the aperture 58.

The second frame member 56 comprises a general C shaped profile. However, in alternate embodiments other types of shapes could be provided. The second frame member 56 is preferably a one-piece metal member. The bottom end of the C shaped profile is mounted to the first frame member 54. The C shaped profile comprises a first section 63 which forms a portion of the hydraulic cylinder area, an opposite second section 66 which forms a top section, and a middle section which forms a side extension 64. The middle section connects the first and second sections 63, 66 to each other. The top section 66 forms an upper die holder section 67 located opposite the lower die holder section 50 of the ram 48. The ram 48 is adapted to move the lower die holder section 50 towards and away from the upper die holder section 67.

The ram 48 and the lower die holder section 50 could be a one piece member. Alternatively, the ram and the second movable member could be two members.

Figure 3:
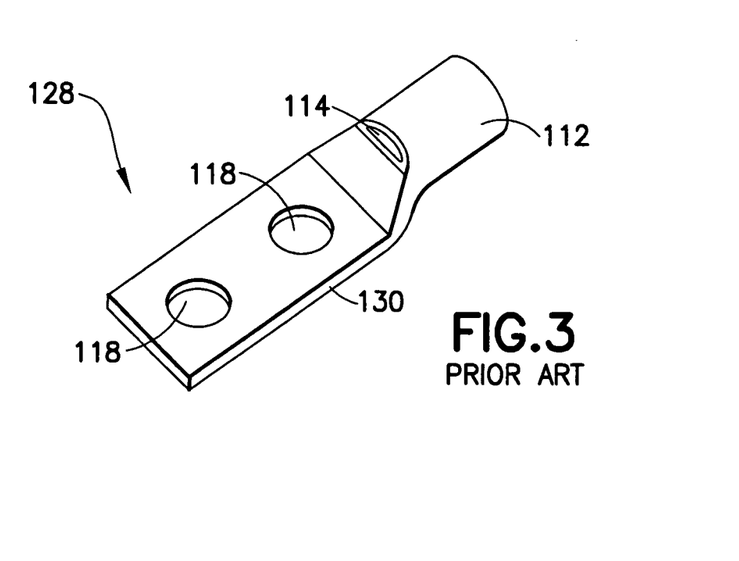
FIG. 3 is a perspective view of a conventional electrical connector.

Referring also to FIG. 3, a perspective view of a conventional electrical connector 128 is shown. The connector 128 is a BURNDY® two hole HYLUG™ electrical conductor. The connector 128 generally comprises a tube section 112 forming a cable receiving area with an inspection window 114, and a lug section 130 with two holes 118. The lug section 130 is mounted to another member by receiving two mounting posts; one in each one of the holes 118.

The two hole connector 128 is used rather than a one hole connector because a larger surface area of contact between the connector and the other member (such as along the bottom surface of the lug section) is needed for electrical reasons. However, a one hole connector can be used in some circumstances rather than the two hole connector 128 because the one hole connector can be less expensive than the two hole connector 128.

In some circumstances, because of the environment, only enough space is available for a one hole connector to be used. This is described in U.S. patent publication No. 2008-0182462 A1, which is hereby incorporated by reference in its entirety. The size of the lug section 130 of the two hole connector 128 would be too large for use in the available area for the connector. However, a user might only have the two hole connector 128 available. In this instance, installers are cutting the two-hole lug section 130 with a saw to make a one-hole lug section. A problem is that only the whole connector having the two-hole lug section is UL approved. Modifications to the two-hole lug could void the Underwriters Laboratories Inc. (UL) approval, especially if an installer gets a bit aggressive while removing the extra lug hole portion of the two-hole lug.

Figure 4:
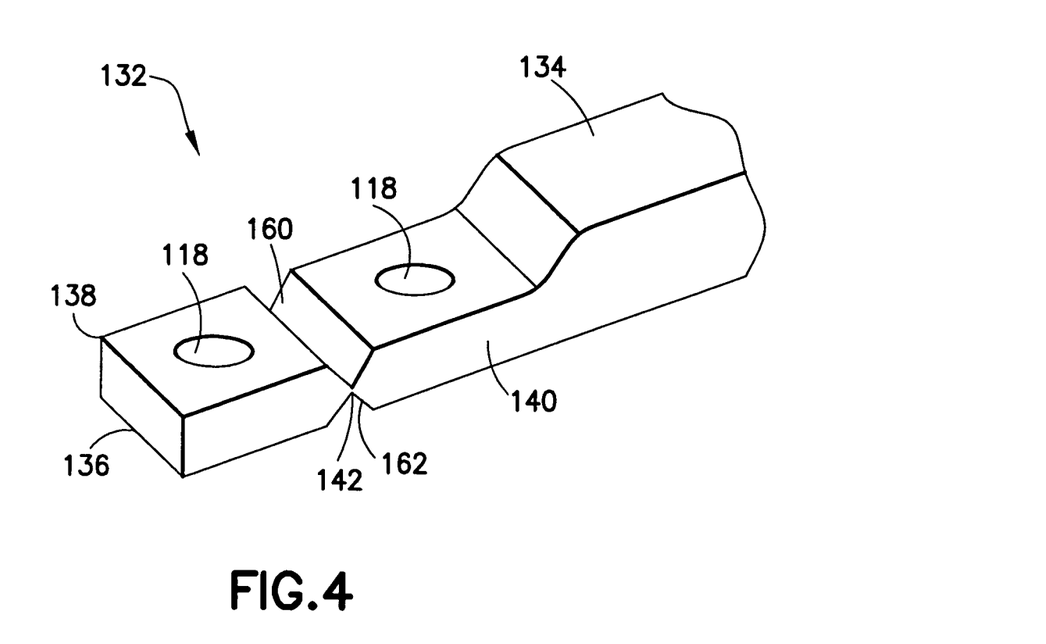
FIG. 4 is a perspective view of an alternate embodiment of the electrical connector shown in FIG. 3.

Referring now to FIG. 4, a perspective view of a portion of an electrical connector 132 described in U.S. patent publication No. 2008-0182462 A1 is shown. This type of connector can be modified by a user from a two hole lug into a one hole lug without voiding the UL certification.

The connector 132 generally comprises a one-piece metal member having a first connection section 134 and a second connection section 136. The first connection section 134 could comprise any suitable connection section for connection to another member, such as a tube section to be crimped onto a wire or cable for example. The second connection section 136 is a lug section or pad or tongue having two mounting holes 118 similar to the connector 128 shown in FIG. 3. However, the lug section 136 has a front portion 138 and a rear portion 140 connected by a weakened section 142. The weakened section 142 comprises laterally extending recesses 160, 162 along the top and bottom sides of the lug section 136 between the front portion 138 and the rear portion 140. The weakened section 142 provides a section of the lug which has a different cross section than the rest of the lug. Preferably, this reduced cross section is weaker than the cross section of the lug at the holes 118. In alternate embodiments, only the top side recess 160 or the bottom side recess 162 could be provided. In another alternate embodiment one or both recesses could comprise a series of non-connected indentations or holes through the height of the lug section. In alternate embodiments, any suitable type or shape of weakened section could be provided.

Figure 5:
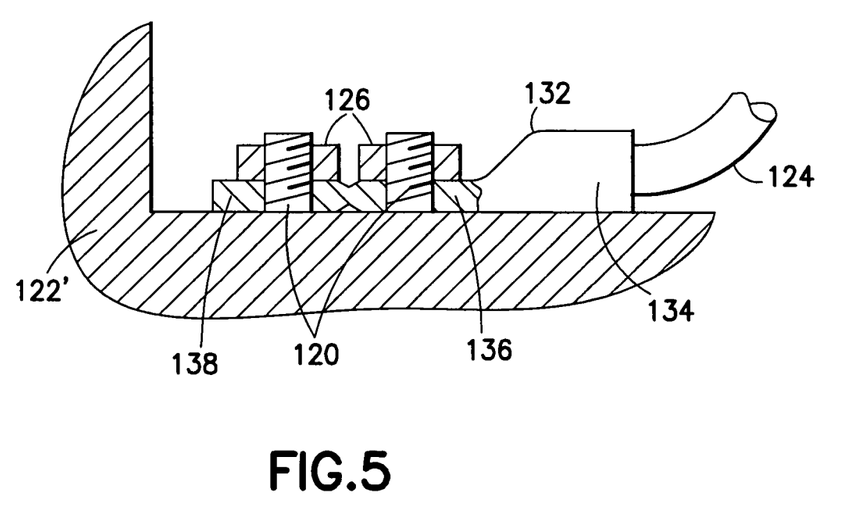
FIG. 5 is a side view of the electrical connector shown in FIG. 4 being used to connect two conductors together.
Figure 6:
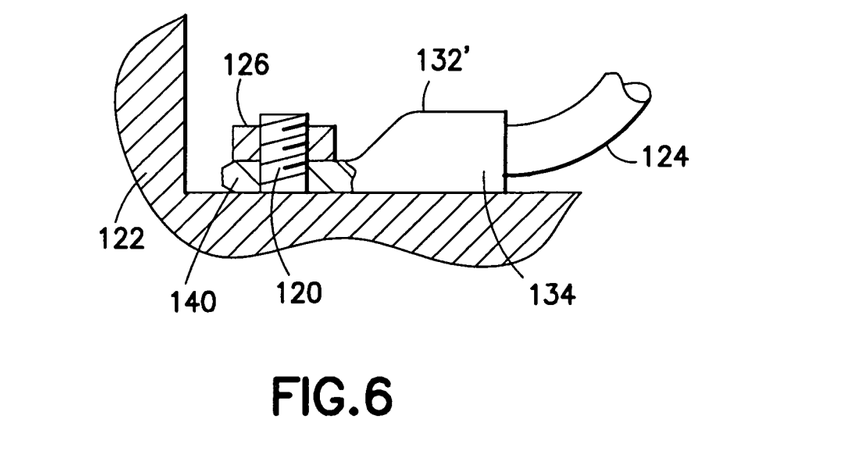
FIG. 6 is a side view of the electrical connector shown in FIG. 4 with a front lug portion removed and being used to connect two conductors together.

The weakened section 142 allows a user to separate the front portion 138 from the rear portion 140 in a controlled manner. With multiple connectors 132, the separation can be performed in a repeatable manner. As shown in FIG. 5, the connector 132 can be used to connect the cable 124 to the member 122' without separating the front portion 138. The lug section 136 can be mounted to the two posts 120 with the fasteners 126. However, as shown in FIG. 6, the same connector can be modified by a user/installer removing the front portion 138 to form the connector 132' for connection to the member 122.

The separation of the front portion 138 from the rear portion 140 could comprise, for example, the use of pliers to bend the lug section at the weakened section and, through metal fatigue, break the weakened section. As another example, a saw could be used to cut the weakened section with the groove(s) of the weakened section forming a guide for the saw. In an alternate embodiment, more than two lug portions could be provided and more than one weakened section could be provided.

In a preferred method, the connector will be UL approved in both its one-hole version, such as 132' for example, and its multi-hole version, such as 132 for example. Thus, a two-hole lug can be modified, in a controlled, reproducible manner into a one-hole lug without voiding the UL approval.

Referring also to FIG. 7, a pair of dies 70, to be used with the tool 24 shown in FIG. 1 (or a similar tool), is shown which are adapted to cut a lug of a connector, such as the connectors 128 or 132 for example. The cutting dies 70 are used in the tool instead of the crimping dies 32. In this example embodiment, a first one 72 of the dies 70 comprises a frame 74 and a spring loaded member 76. The frame 74 comprises a one-piece metal member. The frame 74 has a general stepped shape with a first stepped surface 80 forming a first shearing surface or first contact surface at the first stepped surface. The spring loaded member 76 is located in a bottom step area 82 of first frame 74 and the first contact surface 80 is at a top step area of the first frame 74. The spring loaded member 76 comprises a one-piece metal member which is located, at least partially, in the bottom step area 82. Springs 78 connect the member 76 to the frame 74.

In this example embodiment, a second one 74 of the dies 70 comprises a frame 86. The second frame 86 has a second stepped surface with a second shearing surface 88 at the second stepped surface. The second shearing surface 88 is located opposite the spring loaded member 76. The second frame 86 is a one-piece metal member. The bottom step area 90 of the second frame 86 is sized and shaped to at least partially receive the first stepped surface 80. The pair 70 of dies are adapted to be removably connected to the tool 24.

Figure 8:
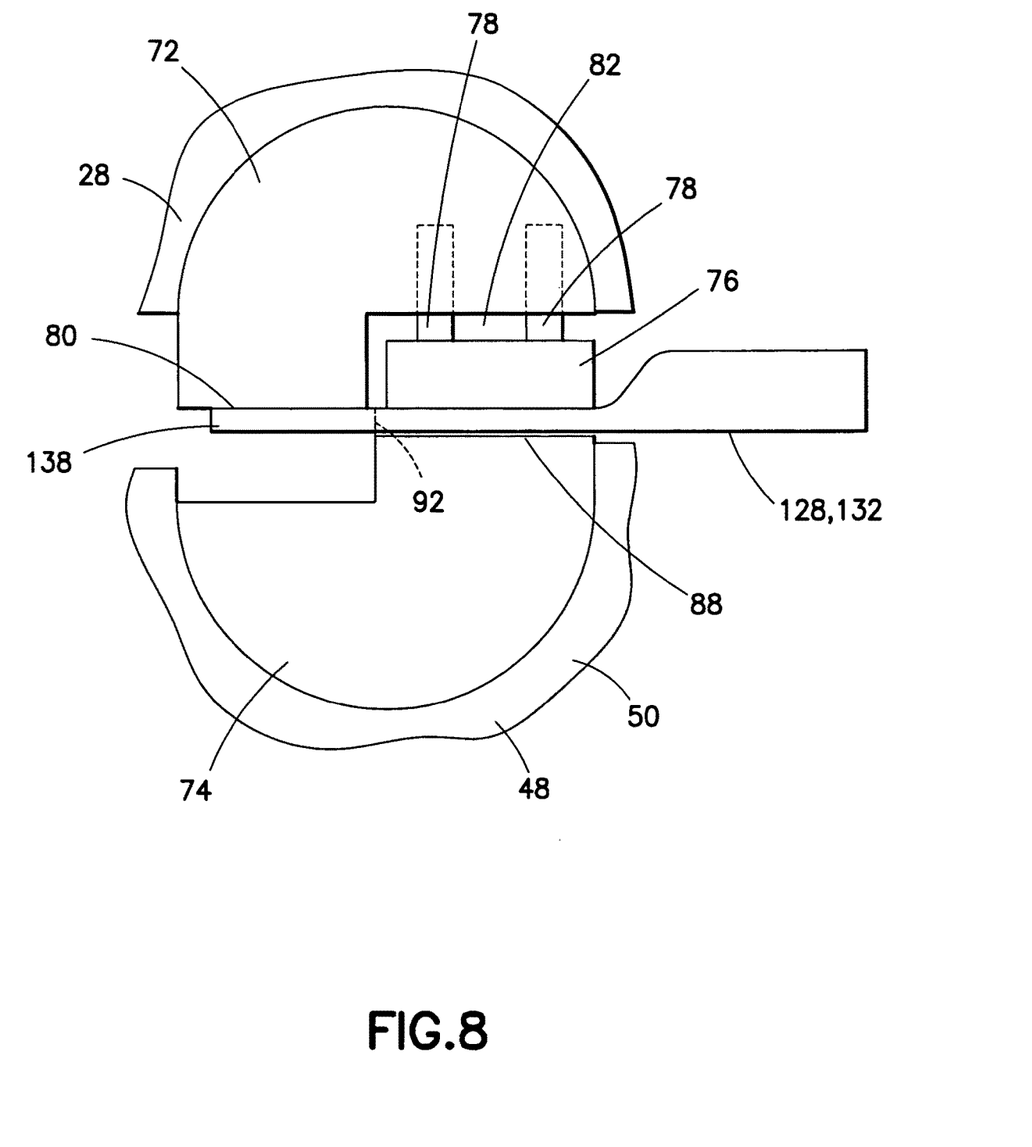
FIG. 8 is a side view illustrating the dies of FIG. 7 and tool of FIG. 1 being used to modify a connector of FIG. 3 or 4.

Referring also to FIG. 8, the pair of dies are shown being used to modify a connector 128 or 132 from a lug having a two holes to a shorter length lug having only one hole (see FIGS. 5-6 for example). When the ram 48 moves the second die 74 towards the first die 72, the rear portion of the lug is clamped between the spring loaded member 76 and the surface 88. With further movement of the ram 48 forward, the member 76 is pressed deeper into the area 82 with the springs 78 compressing. The surface 80 contacts the top side of the lug. With further movement of the ram 48 forward, the two surfaces 80, 88 shear off the front end 138 of the lug at a shear line 92 (which could be the weakened section 142 if the connector 132 is being cut).

It has been discovered that by clamping the rear portion of the lug by the spring loaded member 76, a cleaner or more uniform cut is left at the shear line 92. In addition, with the example embodiment, a machine tool can be used to modify a connector lug rather than merely a manual hand tool. This can be useful if a large number of lugs need to be modified, or if the lugs do not have weakened sections, or if the thickness of the lug is very large (even with a weakened section).

Figure 9:
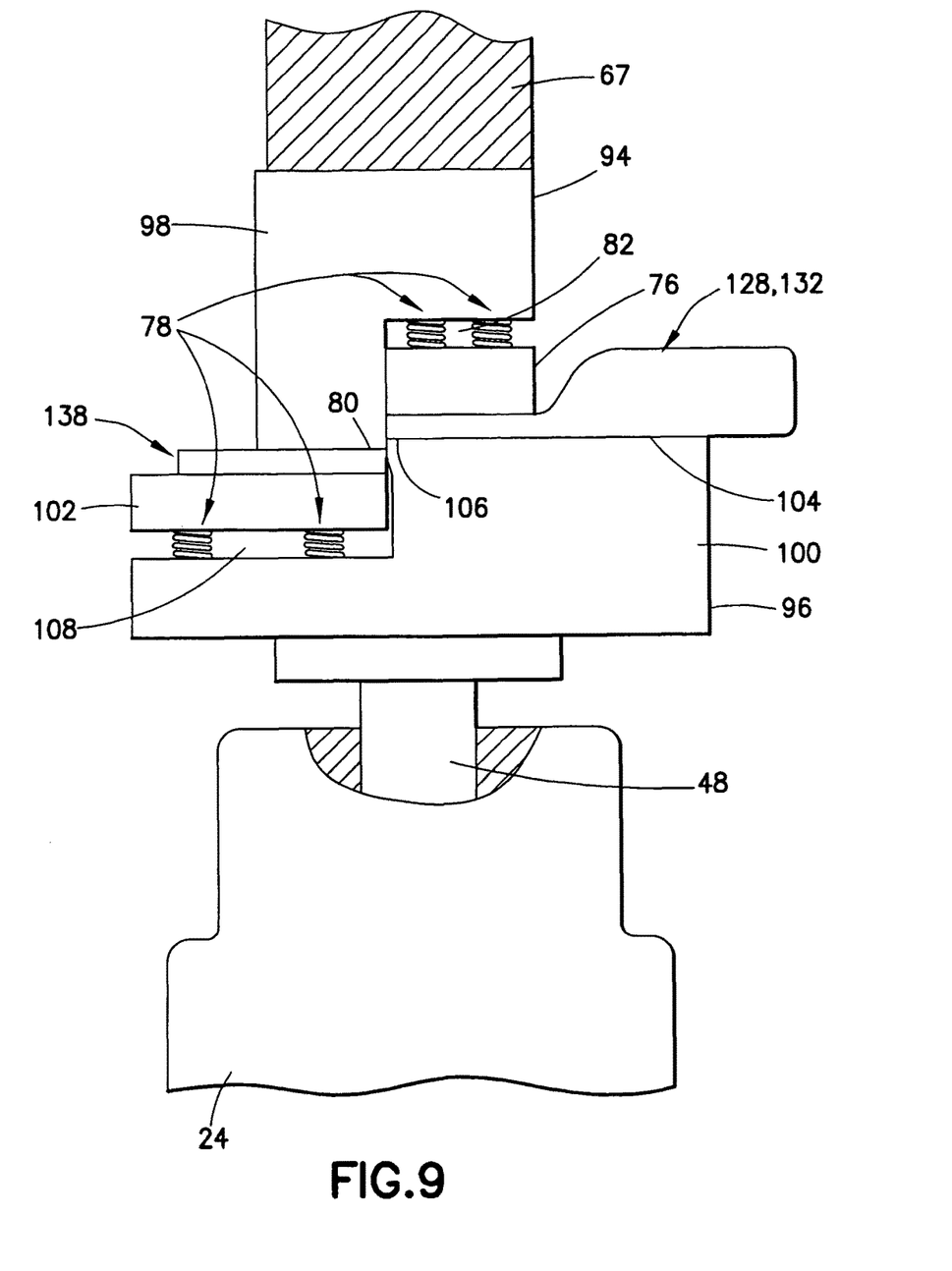
FIG. 9 is a partial and cut away view of the tool shown in FIG. 1 with an alternate embodiment of the lug cutting dies.

Referring also to FIG. 9 an alternate embodiment of the invention is shown. In this example embodiment the tool 24 has a pair of dies 94, 96. The first die 94 is connected to the upper die holder section 67. The first die 94 comprises a frame 98 and the spring loaded member 76. Two springs 78 connect the spring loaded member 76 to the frame 98 similar to the embodiment shown in FIGS. 7-8. The frame 98 is different from the frame 74 in that it is mounted to the upper die holder section 67 generally orthogonal to the orientation in the embodiment of FIGS. 7-8. However, the frame 92 has a stepped surface similar to the stepped surface 80 with a shearing surface and a bottom step area which the member 76 can be compressed into.

The second die 96 is connected to the lower die holder section on the ram 48. The second die 96 comprises a frame 100 and a second spring loaded member 102. Two springs 78 connect the second spring loaded member 102 to the frame 100. The second frame 100 has a stepped surface 104 forming a top shear surface 106 and a bottom step area 108.

When the ram 48 moves the second die 96 towards the first die 94, the rear portion of the lug is clamped between the spring loaded member 76 and the surface 106. Likewise, the front portion of the lug is clamped between the spring loaded member 102 and the surface 80. With further movement of the ram 48 forward, the member 76 is pressed deeper into the area 82 with the springs 78 compressing. The member 102 is pressed deeper into the area 108 with the springs 78 compressing. The surface 80 contacts the top side of the lug and the surface 106 contacts the bottom side of the lug. With further movement of the ram 48 forward, the two surfaces 80, 106 shear off the front end 138 of the lug at a shear line (which could be the weakened section 142 if the connector 132 is being cut). This clamping before and during shearing results in a cleaner and more accurate cut at the shear line without deforming other portions of the lug.

Figure 10:
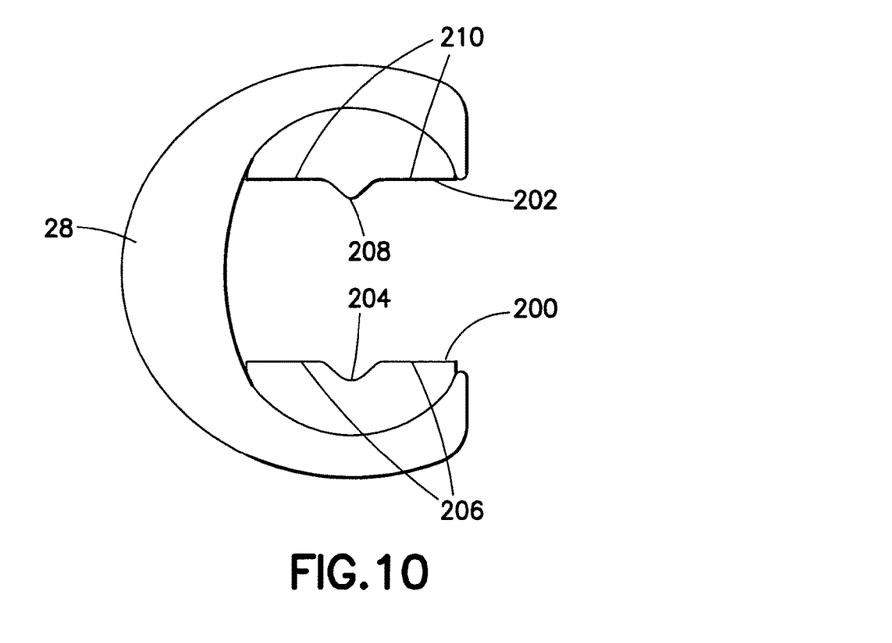
FIG. 10 is a side view of the working head of the tool shown in FIG. 1 with another alternate embodiment of the lug severing dies.
Figure 11:
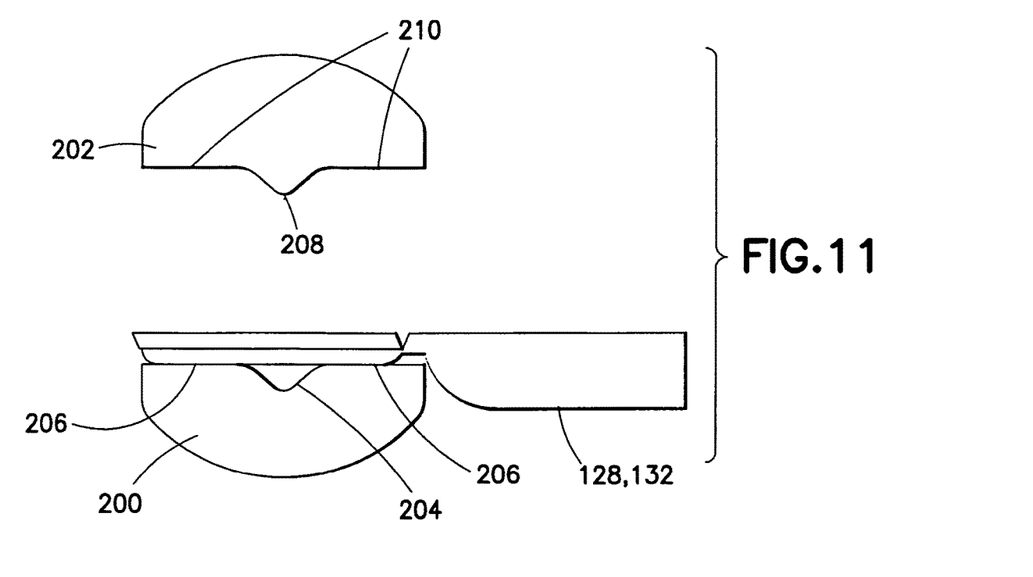
FIG. 11 is a side view of the dies shown in FIG. 10 showing placement of one of the connectors of FIG. 3 or 4 on the first die for subsequent modification.

Referring also to FIGS. 10-11, another example embodiment of the invention is shown. In this embodiment the dies 200, 202 are each a one-piece metal member. The first die 200 comprises a pocket 204 and first lug contact surfaces 206 on opposite sides of the pocket 204. The second die 202 comprises a projection 208 and second lug contact surfaces 210 on opposite sides of the projection 208, wherein the projection is located directly opposite the pocket 204. The first lug contact surfaces 206 are configured to contact a side of the lug on opposite sides of the breakaway recess 160, 162 (see FIG. 4) while the projection 208 severs the lug at the breakaway recess.

Figure 12:
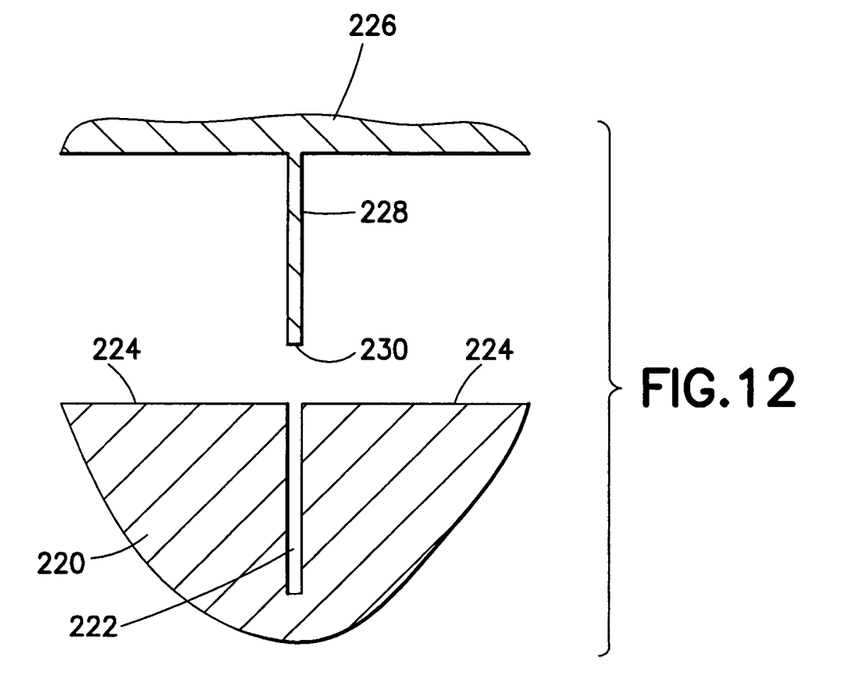
FIG. 12 is a partial cross sectional view of another alternate embodiment of the lug modifying dies.
Figure 13:
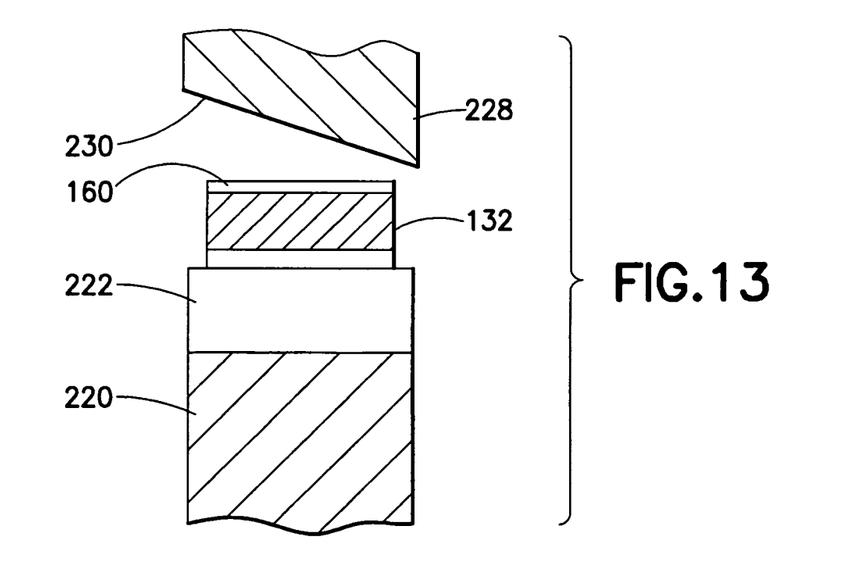
FIG. 13 is a partial cross sectional view of the dies shown in FIG. 12 showing placement of one of the connector of FIG. 4 on the first die for subsequent modification.

Referring also to FIGS. 12-13, another alternate example embodiment is shown. In this embodiment the first die 220 comprises a pocket 222 and lug support surfaces 224 on opposite sides of the pocket 222. The second die 226 comprises a projection 228 with an angled leading surface 230. When the two dies 220, 226 are moved towards each other, the surface 230 can cut through the connector 132. The pocket 222 can receive portions of the projection 228 after the portions pass through the lug of the connector 132. Recess 160 can be used with the projection 228 to center the lug's weakened area at the projection 228 and pocket 222.

Figure 14:
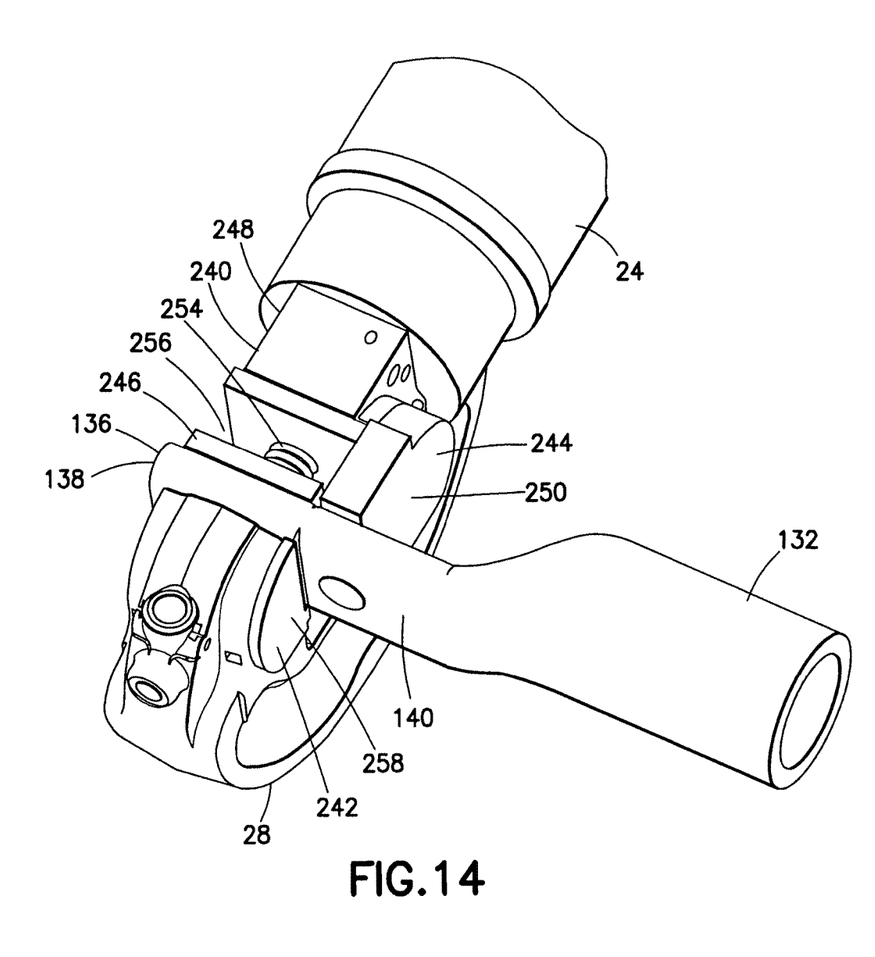
FIG. 14 is a perspective view of the working head of the tool shown in FIG. 1 with another alternate embodiment of the lug severing dies and the connector 132 clamped between the dies.
Figure 15:
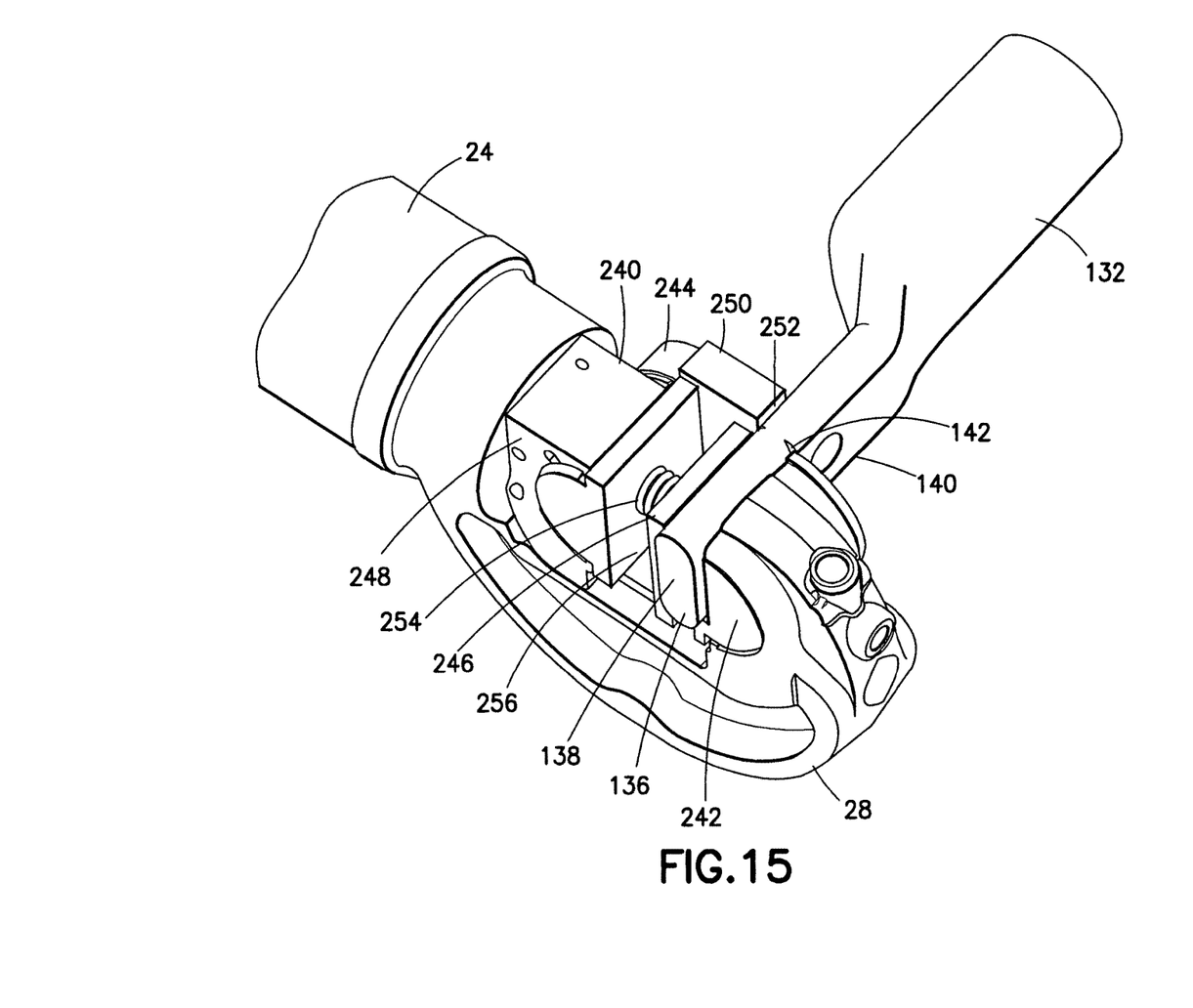
FIG. 15 is a perspective view as in FIG. 14 from another angle.

Referring now also to FIGS. 14-15, another alternate example embodiment is shown. In this example embodiment the working head 28 of the tool 24 has two dies 240, 242 removably connected to the working head. The first die 240 comprises a frame 244 and a spring loaded member 246. The frame 244 comprises a first frame member 248 and a second frame member 250. The second frame member 250 is attached to a lateral side of the first frame member 248. The second frame member 250 has a leading end 252 located in front of the front of the first frame member 248. The leading end 252 forms a shearing surface for directly contacting the lug of the connector 132.

A spring 254 extends from the front of the first frame member 248. The spring loaded member 246 is attached to the end of the spring 254. The spring loaded member 246 has a front face which is initially located past the leading end 252. However, as the lug of the connector 132 is clamped between the two dies 240, 242, the member 246 is moved into the space 256 and the spring 254 is compressed. The second die 242 is a one-piece metal member with a top surface which contacts the opposite side of the lug of the connector 132. The inward edge of the leading end 252 of the second frame member 250 is located slightly laterally past the outer lateral side 258 of the second die 242.

The weakened section 142 of the lug is located at the shear area between the leading end 252 and the side 258. The lug is initially clamped between the spring loaded member 246 and the second die 242. Further movement of the frame 244 by the ram of the tool 24 causes the leading end 252 of the second frame member 250 and the second die 242 at the side 258 to shear off the front portion 138 from the rear portion 140 of the lug 136 at the weakened section 142. Because the front portion 138 of the lug 136 is clamped between the spring loaded member 246 and the second die 242, the sheared end of the rear portion 140 at the former weakened section 142 is relatively clean and precise; without irregularities which use of a hand saw might otherwise produce. In addition, the locational accuracy of the shear cut on a lug section is repeatable for multiple connectors subsequently modified by the tool and dies.

A die set can be provided which is adapted to remove an end of a substantially flat lug of an electrical connector, the die set comprising a first die comprising a first frame and a spring loaded member connected to the first frame, wherein the first frame comprises a first contact surface adapted to directly contact a first side of the lug; and a second die comprising a second frame having a second contact surface adapted to contact a second side of the lug at a position offset from the first contact surface, wherein the spring loaded member is adapted to contact the first side of the lug directly opposite the second contact surface, and wherein the first and second contact surfaces are adapted to shear off the end of the lug from the electrical connector.

The first frame can have a first stepped surface with a first shearing surface at the first stepped surface. The spring loaded member can be located in a bottom step area of first frame and the first contact surface is at a top step area of the first frame. The second frame can have a second stepped surface with a second shearing surface at the second stepped surface. The second die can further comprise a second spring loaded member connected to the second frame, wherein the second spring loaded member is adapted to contact the second side of the lug directly opposite the first contact surface. The second spring loaded member can be located in a bottom step area of second frame and the second contact surface is at a top step area of the second frame. The second die can further comprise a second spring loaded member connected to the second frame, wherein the second spring loaded member is adapted to contact the second side of the lug directly opposite the first contact surface. The second frame can be a one-piece metal member. The one-piece metal member can have a stepped surface with a shearing surface between steps of the stepped surface. The first contact surface can be located laterally offset from the second frame.

A tool can be provided comprising a working head comprising the die set described above at the working head. The tool can further comprise a tool frame forming at least a portion of the working head; a hydraulic drive system in the tool frame; and a ram movably mounted to the tool frame, wherein the dies of the die set are respectively connected to the ram and the tool frame at the working head.

A tool can be provided comprising a working head adapted to remove an end of a substantially flat lug of an electrical connector, wherein the lug comprises a laterally extending breakaway recess on an exterior side, wherein the working head comprises dies configured to contact opposite sides of the lug and break the lug proximate the breakaway recess. The dies can comprise a first die comprising a first frame and a spring loaded member connected to the first frame, wherein the first frame comprises a first contact surface adapted to directly contact a first one of the sides of the lug; and a second die comprising a second frame having a second contact surface adapted to contact a second one of the sides of the lug at a position offset from the first contact surface, wherein the spring loaded member is adapted to contact the first side of the lug directly opposite the second contact surface, and wherein the first and second contact surfaces are adapted to shear off the end of the lug from the electrical connector. A first one of the dies can comprise a pocket and first lug contact surfaces on opposite sides of the pocket; and a second one of the dies comprises a projection and second lug contact surfaces on opposite sides of the projection, wherein the projection is located directly opposite the pocket, wherein the first lug contact surfaces are configured to contact a side of the lug on opposite sides of the breakaway recess while the projection severs the lug at the breakaway recess. The projection can have a angled leading edge.

A method can be provided comprising placing a substantially flat lug of an electrical connector between two dies; and moving the two dies towards each other, wherein a first contact surface of a first one of the dies is offset from a second contact surface of a second one of the dies to shear off an end of the lug from the electrical connector, and wherein the first die comprises a first spring loaded member contacting the lug directly opposite the second contact surface.

During the step of moving, the second die can comprise a second spring loaded member contacting the lug directly opposite the first contact surface. The first spring loaded member can contact the lug before the first contact surface contacts the lug. The first die can comprise a first frame with a stepped surface and a shearing surface between steps of the stepped surface, and wherein the first spring loaded member is located in a bottom step area of first frame such that the first spring loaded member is compressed into the bottom step area by the lug.

It should be understood that the foregoing description is only illustrative of the invention. Various alternatives and modifications can be devised by those skilled in the art without departing from the invention. For example, features recited in the various dependent claims could be combined with each other in any suitable combination(s). In addition, features from different embodiments described above could be selectively combined into a new embodiment. Accordingly, the invention is intended to embrace all such alternatives, modifications and variances which fall within the scope of the appended claims.

What is claimed is:

1. A die set adapted to remove a front end of a substantially flat lug of an electrical connector, the die set comprising:
    a first die comprising a first frame and a spring loaded member connected to the first frame, wherein the first frame comprises a first contact surface adapted to directly contact a first side of the lug; and
    a second die comprising a second frame having a second contact surface adapted to contact a second side of the lug at a position offset from the first contact surface, wherein the spring loaded member is adapted to contact the first side of the lug directly opposite the second contact surface, and wherein the first and second contact surfaces are adapted to shear off the front end of the lug from the electrical connector, wherein the first frame has a first stepped surface with a first shearing surface at the first stepped surface, wherein the second frame is a one-piece metal member, and where the spring loaded member is a sole spring loaded member of the die set and, wherein the second frame comprises a bottom step area providing space for partially receiving the first shearing surface and the front end of the flat lug when sheared off, the bottom step area open to at least one side of the second frame allowing the front end of the flat lug to exit the die set.

2. A die set as in claim 1 wherein the spring loaded member is located in a bottom step area of first frame and the first contact surface is at a top step area of the first frame.

3. A die set as in claim 2 wherein the second frame has a second stepped surface with a second shearing surface at the second stepped surface.

4. A die set as in claim 1 wherein the one-piece metal member has a stepped surface with a shearing surface between steps of the stepped surface.

5. A die set as in claim 1 wherein the first contact surface is located laterally offset from the second frame.

6. A tool comprising a working head comprising the die set of claim 1 at the working head.

7. A tool as in claim 6 further comprising:
a tool frame forming at least a portion of the working head;
a hydraulic drive system in the tool frame; and
a ram movably mounted to the tool frame,
wherein the dies of the die set are respectively connected to the ram and the tool frame at the working head.

8. A die set comprising:
a first die comprising a first frame and a spring loaded member connected to the first frame, wherein the first frame comprises a first contact surface adapted to directly contact a front end of a first side of a substantially flat lug of an electrical connector; and
a second die comprising a second frame having a second contact surface adapted to contact a front end of a second side of the lug at a position offset from the first contact surface,
wherein the spring loaded member is adapted to contact the front end of the first side of the lug directly opposite the second contact surface, and wherein the first and second contact surfaces are adapted to shear off the front end of the lug from the electrical connector, where the first frame has a first shearing surface, where the spring loaded member is a sole spring loaded member of the die set, and where the die set is adapted to remove the front end of the substantially flat lug of the electrical connector where the second frame comprises a bottom step area providing space for partially receiving the first shearing surface and the front end of the flat lug when sheared off, the bottom step area open to at least one side of the second frame allowing the front end of the flat lug to exit the die set.

* * * * *